US007373319B2

(12) United States Patent
Kopelman et al.

(10) Patent No.: US 7,373,319 B2
(45) Date of Patent: May 13, 2008

(54) METHOD AND APPARATUS FOR FACILITATING SALES OF GOODS BY INDEPENDENT PARTIES

(75) Inventors: Joshua M Kopelman, Gladwyne, PA (US); Srinivas Balijepalli, Philadelphia, PA (US)

(73) Assignee: eBay, Inc., San Jose, CA (US)

( * ) Notice: Subject to any disclaimer, the term of this patent is extended or adjusted under 35 U.S.C. 154(b) by 74 days.

(21) Appl. No.: 10/743,982

(22) Filed: Dec. 22, 2003

(65) Prior Publication Data

US 2004/0138966 A1 Jul. 15, 2004

Related U.S. Application Data

(63) Continuation of application No. 09/427,958, filed on Oct. 27, 1999.

(51) Int. Cl.
  *G06Q 30/00* (2006.01)
(52) U.S. Cl. ...................................................... 705/27
(58) Field of Classification Search ................. 705/26, 705/27, 37
  See application file for complete search history.

(56) References Cited

U.S. PATENT DOCUMENTS

| | | |
|---|---|---|
| 4,613,946 A | 9/1986 | Forman |
| 4,799,156 A | 1/1989 | Shavit et al. |
| 5,592,375 A | 1/1997 | Salmon et al. |
| 5,664,111 A | 9/1997 | Nahan et al. |
| 5,715,402 A | 2/1998 | Popolo |
| 5,732,400 A | 3/1998 | Mandler et al. |
| 5,790,790 A | 8/1998 | Smith et al. |
| 5,797,127 A | 8/1998 | Walker et al. |

(Continued)

FOREIGN PATENT DOCUMENTS

GB   1489572   * 10/1977

(Continued)

OTHER PUBLICATIONS

@MOTSHOP.COM, "Mothers' Online Thrift Shop", *Storefront Development Corporation*, at Mothers' Online Thrift Shop, (http://www.motshop.com) excerpts printed Jun. 17, 2000-Jun. 19, 2000, 25.

(Continued)

*Primary Examiner*—Gerald J. O'Connor
(74) *Attorney, Agent, or Firm*—Synnestvedt & Lechner LLP; Gregory S. Bernabeo

(57) ABSTRACT

A method for facilitating sales of goods by independent parties. An independent seller is presented with a menu including selectable options for deriving a sale price for the independent seller's good. Each of the options corresponds to a respective predetermined method for determining the sale price. The sale price for the independent seller's good is derived using the predetermined method corresponding to a seller-selected option. Goods in addition to those registered for sale at a website of the marketeer may be presented in an electronic marketplace. Information concerning such additional goods may be retrieved from a database accessible to the marketeer controller. If a buyer wishes to purchase a certain good from the electronic marketplace, and the certain good has not been registered for sale at the website of the marketeer, the marketeer may refer the buyer to a third party vendor.

20 Claims, 3 Drawing Sheets

U.S. PATENT DOCUMENTS

| | | | |
|---|---|---|---|
| 5,842,199 | A | 11/1998 | Miller et al. |
| 5,845,265 | A | 12/1998 | Woolston |
| 5,897,622 | A | 4/1999 | Blinn et al. |
| 5,950,178 | A | 9/1999 | Borgato |
| 5,960,411 | A | 9/1999 | Hartman et al. |
| 6,012,045 | A | 1/2000 | Barzilai et al. |
| 6,016,475 | A | 1/2000 | Miller et al. |
| 6,016,504 | A | 1/2000 | Arnold et al. |
| 6,029,141 | A | 2/2000 | Bezos et al. |
| 6,047,264 | A | 4/2000 | Fisher et al. |
| 6,055,513 | A | 4/2000 | Katz et al. |
| 6,061,448 | A | 5/2000 | Smith et al. |
| 6,076,070 | A | 6/2000 | Stack |
| 6,085,176 | A | 7/2000 | Woolston |
| 6,101,484 | A | 8/2000 | Halbert et al. |
| 6,108,493 | A | 8/2000 | Miller et al. |
| 6,119,101 | A | 9/2000 | Peckover |
| 6,119,137 | A | 9/2000 | Smith et al. |
| 6,178,408 | B1 | 1/2001 | Copple et al. |
| 6,192,407 | B1 | 2/2001 | Smith et al. |
| 6,202,051 | B1 | 3/2001 | Woolston |
| 6,243,691 | B1 | 6/2001 | Fisher et al. |
| 6,308,168 | B1 | 10/2001 | Dovich et al. |
| 6,321,221 | B1 | 11/2001 | Bieganski |
| 6,334,127 | B1 | 12/2001 | Bieganski et al. |
| 6,356,879 | B2 | 3/2002 | Aggarwal et al. |
| 6,412,012 | B1 | 6/2002 | Bieganski et al. |
| 6,415,263 | B1 * | 7/2002 | Doss .................. 705/26 |
| 6,415,269 | B1 | 7/2002 | Dinwoodie |
| 6,502,080 | B1 * | 12/2002 | Eichorst et al. .............. 705/400 |
| 6,606,607 | B1 * | 8/2003 | Martin et al. .................. 705/37 |

FOREIGN PATENT DOCUMENTS

| | | |
|---|---|---|
| WO | WO-9907121 | 11/1999 |

OTHER PUBLICATIONS

AMAZON, "Amazon.com: Books", *[online] [Retrieved on Jul. 8, 2002] Retrieved from the Internet using <URL http://www.amazon.com/exec/obidos/tg/browse/283155/ref=tab_gw_b_3/102-9150031-1671331 (3 pp.)*, (Jul. 8, 2002).

AMAZON, "An exemplary online retail seller was accessible at the time of filing of the above-identified application", *Via the Internet URL http://www.amazon.com*, (Mar. 3, 2000).

BOOKPRICE, "BookPrice Compare.com Coupons and discounts", *[[online] [Retrieved on Jul. 8, 2002] Retrieved from the Internet using <URL http://www.bookpricecompare.com/bin/search.cgi?find=Compare&A 0618037667=1 (1 p.)*, (Jul. 8, 2002).

BOOKS.COM, "An exemplary online shopping agent was accessible at the time of filing of the above-identified application", *Via the Internet URL http://www.books.com*, (Mar. 3, 2000).

EBAY, "eBayListing: Action & Adventure", *[online] [Retrieved on Jul. 8, 2002] Retrieved from the Internet using <URL httpL//listings.ebay.com/aw/plistings/list/allcategory271/index.html?ssPageName=bookhubactionadventure (4 pp.)*, (Jul. 8, 2002).

PRICELINE, "Priceline.com", *Name your own price and save on airline tickets, hotelrooms, new cars, home mortgages . . . [online] [Retrieved on Jul. 8, 2002] Retrieved from the Internet using <URL http://www/priceline.com/customerservice/faq/howitworks/howitworks.asp?session_key=D10011AC23001*, (Jul. 8, 2002).

Storefront Development Corp., "Method For Buying And Selling Merchandise In A Network Of Users", *Excerpt of document titled "Method for Buying and Selling Merchandise In A Network of Users", a document alleged to have been filed as a patent application around June of 1999.*, (Jun. 12, 2000), 17.

* cited by examiner

METHOD AND APPARATUS FOR FACILITATING SALES OF GOODS BY INDEPENDENT PARTIES

CROSS-REFERENCE TO RELATED APPLICATION

This application is a continuation of U.S. patent application Ser. No. 09/427,958, filed Oct. 27, 1999, the entire disclosure of which is hereby incorporated herein by reference.

FIELD OF THE INVENTION

This invention relates generally to the field of electronic commerce and more particularly to a method and apparatus for using communication networks to price goods in electronic commerce applications.

BACKGROUND OF THE INVENTION

The industrial age has given rise to a global economy of factories engaged in mass production of various goods. An enormous amount of commerce is transacted in the buying and selling of such goods. While some such goods lose their value with use, e.g., food products, many such goods retain a substantial portion of their value even after use or ownership by another. Such goods are referred to herein as "durable." A considerable amount of commerce is transacted in the buying and selling of durable goods, particularly used durable goods.

Almost all durable goods are readily identifiable by a standard unique identification code ("ID code"), particularly those that are mass produced. In the case of computer software, music cassettes or compact discs, videocassettes and digital video discs, the ID code may be a human readable Universal Product Code ("UPC"), a thirteen digit ID code that readily identifies the good. In the case of books, magazines or other publications, the ID code may be a ten-digit International Standard Book Number ("ISBN"). Other items are more readily identified by a manufacturer or brand name and a model number, as for baseball cards and consumer electronics, e.g., a Sony® KV-3620 television. Some goods may be identified by more than one type of ID code.

Many durable and readily identifiable goods are fungible items that derive their value substantially from their common characteristics. For example, a single signed copy of Michael Jackson's album titled "Thriller" and recorded on a compact disc ("CD") derives much of its value because it is signed by the performance artist. Such a CD is unique and therefore is not a fungible good. In contrast, an unsigned copy of Michael Jackson's "Thriller" CD derives substantially all of its value because of the songs recorded thereon. Therefore, all such CD's have substantially the same value to consumers. Such CD's are therefore fungible.

Auctions provide one type of marketplace for selling goods. Used goods sold at auction are sold at prices set by interested buyers. An auctioneer facilitates sale transactions without the need to maintain goods in inventory. Auctions are particularly good for sellers to ensure a highest possible sale price, especially for unique, non-fungible items. However, determining and ensuring a fair price is difficult for buyers. Buyers must have a high degree of knowledge to determine whether a price for a certain good is fair.

Retail selling also provides a marketplace for sale of goods. Used goods sold at retail are sold at prices set by a seller. Retail selling is advantageous to the seller because it allows the seller to control the price of the good. However, it requires the seller to maintain a large inventory of goods, which is expensive and disadvantageous. Competition, particularly for fungible goods, drives prices downwardly, which is advantageous to the buyer. The seller must have a high degree of knowledge to ensure that his price is competitive. In addition, a price for a good may be fair to the buyer when set by the seller, but may no longer be fair if market conditions change after the price is set and before the buyer purchases the good.

Electronic commerce, or Internet-based sales are common and have problems similar to retail. Numerous online auctions may be found. An example of such an online auction is held by eBay Inc. of San Jose, Calif., at www.ebay.com. Such auctions are better suited to unique goods but are also used for fungible goods. However, "bidding wars" between buyers can lead to high prices for such goods, whether new or used.

Retail type sales are also conducted at numerous online websites, such as www.amazon.com. Online retail selling is also disadvantageous because it requires the seller to maintain a substantial inventory of goods. A reverse-auction system, where a seller may accept a price set by a buyer is provided on the worldwide web at www.priceline.com by priceline.com Inc. of Stamford, Conn. U.S. Pat. No. 5,797,127 to Walker et al. discloses a reverse auction method, apparatus and program for pricing, selling and exercising options to purchase airline tickets.

For electronic commerce applications, software-implemented shopping agents are well known. Using a shopping agent, a buyer can identify vendors and prices for a good. One type of shopping agent queries multiple vendor's websites to determine a best price or list of prices. For example Cendant Corp. of New York, N.Y. is a retail seller of new books that provides access to such a shopping agent on the worldwide web at www.books.com. Books.com uses a pricing agent ("Price Compare") to price items it sells and holds in its inventory. It uses the shopping agent to query several competitors and, if its price for a new book is not less than its competitors' prices, the pricing agent sets the price for its new book at less than the lowest competitor's price for the same new book. However, the seller still controls the price since it determines the method used by its pricing agent to set the price. In addition, the seller is required to maintain a substantial inventory of books.

Until now, there has been no acceptable way to facilitate sales of goods that ensures fair pricing while eliminating the need for inventory and minimizing pricing burdens on the buyer and the seller. In addition, there is no acceptable way to exploit the fungible nature of durable goods.

Accordingly, it is an object of the present invention to provide a method for facilitating pricing and sales of goods.

It is another object of the present invention to provide a method which does not require maintenance of an inventory of goods.

It is yet another object of the present invention to provide a method for pricing goods for sale by independent sellers.

It is a further object of the present invention to ensure lowest pricing of goods which exploits the fungible nature of goods.

It is yet a further object of the present invention to exploit the fungible nature of used durable goods to price goods.

It is yet a further object of the present invention to derive a price for an independent seller's good as a function of a third party's price for a similar good.

It is yet a further object of the present invention to provide an apparatus for facilitating sales and pricing of goods.

It is yet a further object of the present invention to provide a computer-implemented method for facilitating sales and pricing of goods.

SUMMARY OF THE INVENTION

The invention provides a method for facilitating sales of goods of independent parties by an intermediary, referred to herein as the "marketeer". Goods in addition to those listed or registered for sale by sellers at the marketeer's website are presented by the marketeer for browsing by a buyer. Information concerning such additional goods may be retrieved from a database accessible to the marketeer controller. In one embodiment, the marketeer refers the buyer to a third party vendor if the buyer wishes to purchase the good and the good sought by the buyer is not listed for sale with the marketeer, e.g., by presenting a link to the vendor's website.

An independent seller may be presented with a menu including selectable options for deriving a sale price for the independent seller's good. Each of the options corresponds to a respective predetermined method for determining the sale price. The sale price for the independent seller's good is derived using the predetermined method corresponding to a seller-selected option.

DETAILED DESCRIPTION

The present invention provides a method and apparatus for facilitating sales between buyers and sellers and pricing goods for sale. A marketeer facilitates sales and pricing of the sellers' goods. In one embodiment, an index price is obtained from a third party at a time proximate to the time the seller registers the good with the marketeer as a good offered for sale by the seller. In another embodiment, the index price is obtained from a third party at a time proximate to the time the buyer wishes to buy the good. The seller thereby agrees, before the sale, to sell his good at a sale price determined by the marketeer using an index price as a reference. The seller may specify a method for deriving the sale price as a function of the index price. Alternatively, the marketeer may specify the method. In alternate embodiments, the seller is presented with additional alternative options for pricing the seller's good, e.g., to specify a fixed price, or to specify a discount from a suggested retail price, i.e., a "list" or "cover" price instead of deriving a price from an index price. The marketeer may optionally store a database of suggested retail prices.

Figure 1:
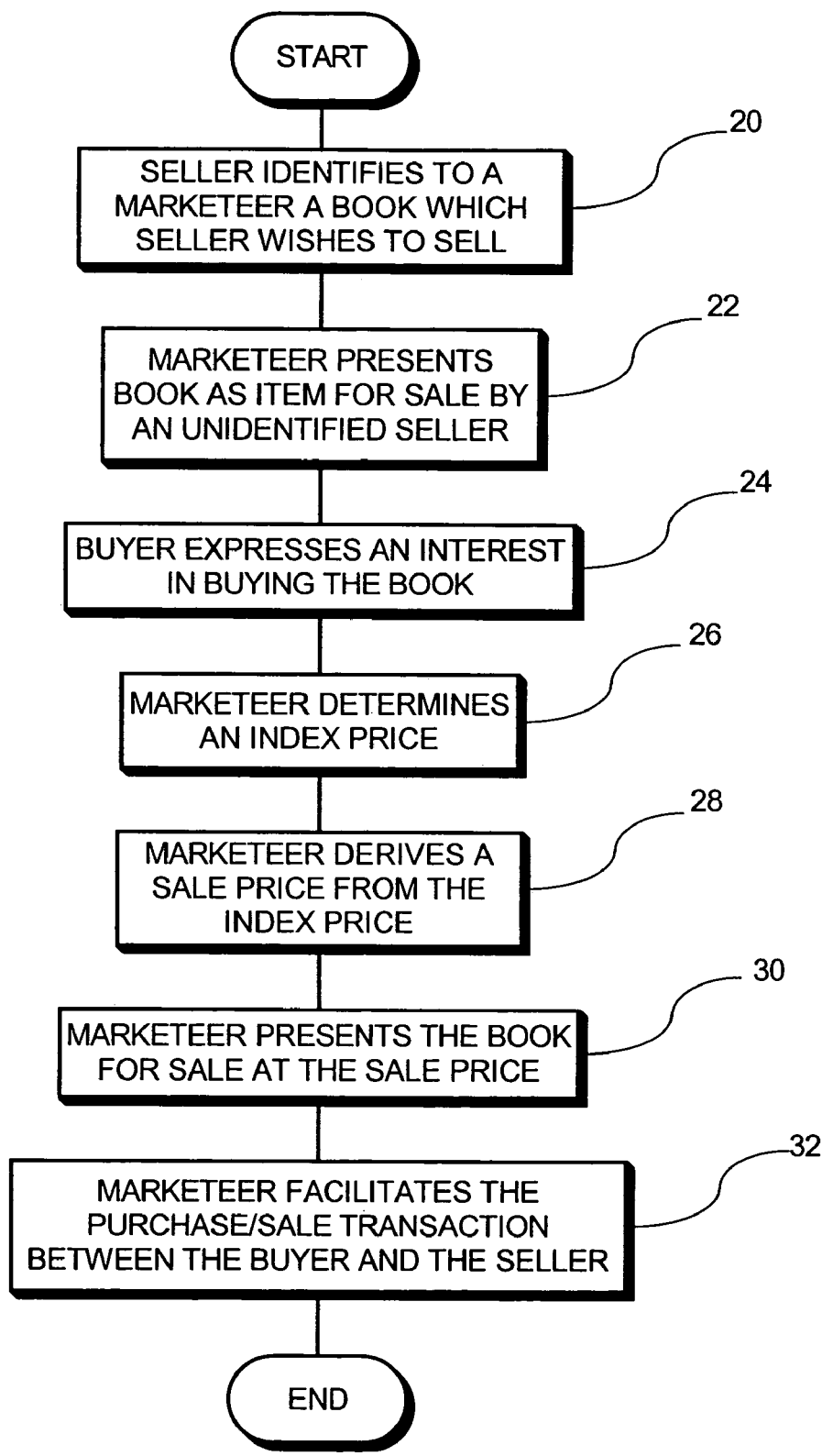
FIG. 1 is a flow diagram providing an example of a transaction in accordance with the present invention.

FIG. 1 is a flow diagram providing an example of a transaction in accordance with the present invention in which the index price is determined at or near the time of the sale. By way of example, the invention will be discussed below in the contexts of sale of a used paperback copy of Sue Grafton's book titled "A is for Alibi." First, a seller identifies ("registers") his book for sale with the marketeer as shown at step 20. The marketeer does not take possession of the book for inventory purposes but rather registers the book as an item for sale. The marketeer presents the book in a marketplace as an item for sale by an undisclosed seller, as shown at step 22. If the method is computer-implemented, the marketplace may be a website and the book may be presented using images and/or text retrieved from an existing database—such information need not be provided by the seller. To a buyer, it may appear that the book is being offered for sale by the marketeer. In an alternate embodiment, the marketplace could be a conventional type storefront including a booth or kiosk presenting a printed catalog or brochure depicting goods, and/or product samples representing goods for sale.

Figure 2:
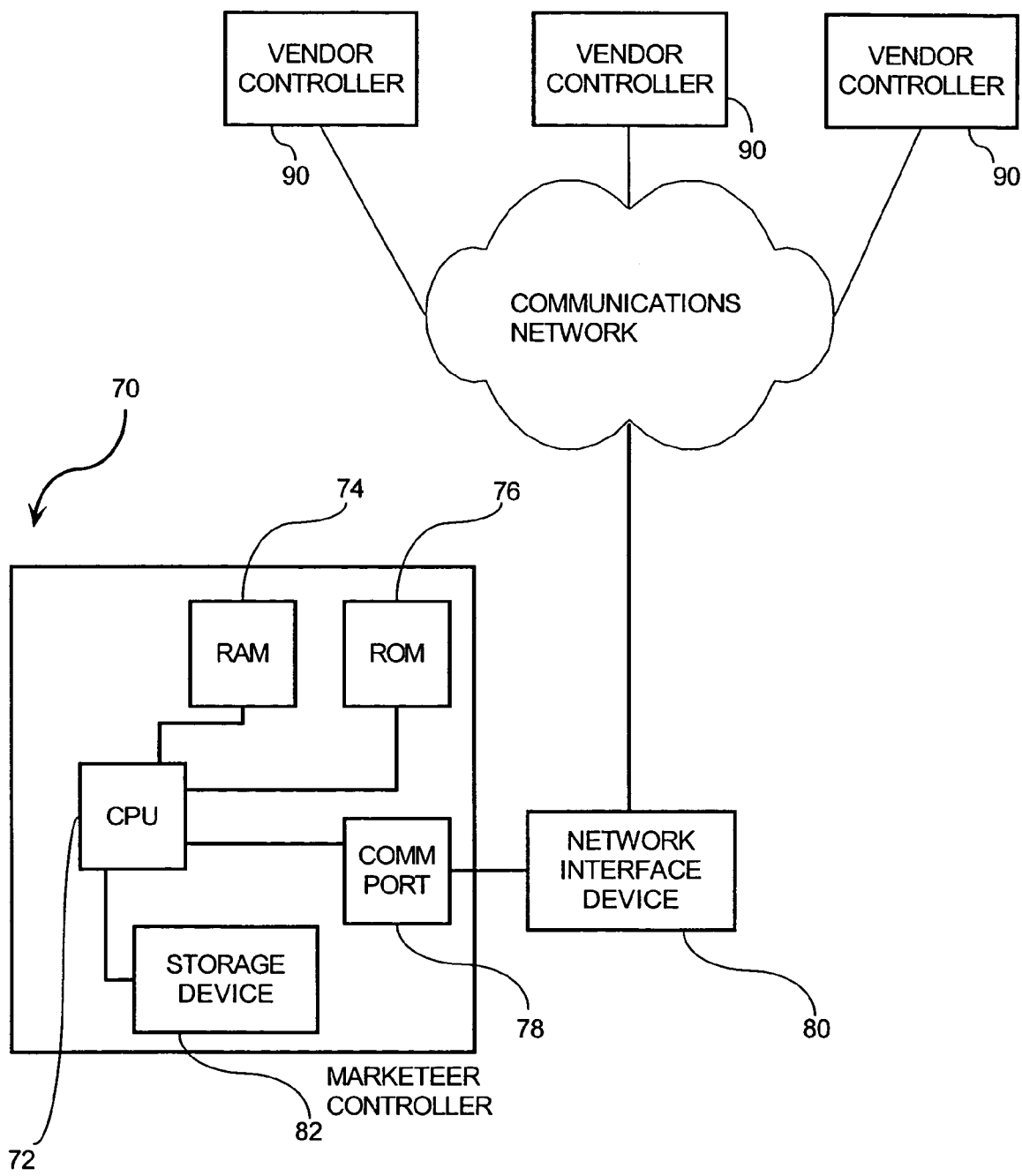
FIG. 2 is a block diagram showing a marketeer controller in accordance with the present invention.

The buyer may browse the marketplace and the goods presented for sale by the marketeer. When the buyer expresses an interest in a book, the marketeer determines an index price for the book, as shown at steps 24 and 26. In one embodiment, the index price is an independent third party's price for a comparable good, preferably a new book, if the seller is offering a used book. In an alternate embodiment, the index price is the lowest price among a group of independent third parties' prices for the comparable good. If the method is computer-implemented, the index price may be determined by querying a third party vendor's computer or web server 90 ("controller", as shown in FIG. 2), e.g., using a standard product identification code such as a universal product code ("UPC") or International Standard Book Number ("ISBN"). For example, the marketeer could query amazon.com to determine that amazon.com is selling a new paperback copy of "A is for Alibi" for $10 and set the index price to $10. Determining an index price proximate the time of sale to the buyer ensures a fair or lowest price for the good relative to other vendors' prices.

The marketeer then derives a sale price from the index price, as shown at step 28. In one embodiment, the method for deriving the price is determined by the marketeer. In another embodiment, the method for deriving the price is specified by the seller at the time the seller presents the good to the marketeer for sale. For example, the method may represent a discount from the index price, e.g., a 50% discount from the index price. In this example, the marketeer derives a sale price of $5 for the seller's used book by applying a 50% discount to amazon.com's price of $10 for a new paperback copy of "A is for Alibi". This ensures that the sale price is fair, in one embodiment, or the lowest price, in another embodiment. The marketeer then presents the book for sale to the buyer at the sale price. If the buyer decides to buy the book at the sale price, the marketeer facilitates the purchase/sale transaction between the buyer and the seller, as shown at step 30 and 32. The marketeer may facilitate the sale, for example, by identifying the buyer to the seller and the seller to the buyer and permitting the buyer and seller to complete the transaction. Alternatively, the marketeer may facilitate the same by referring the parties to a third party intermediary acting as a clearinghouse for the transaction, or by acting as the clearinghouse itself. When the marketeer acts as the clearinghouse, it receives only sold goods and therefore has no inventory in the traditional sense. In the preferred embodiment, the marketeer is compensated for facilitating the transaction.

It should be appreciated that such a transaction may be implemented in a variety of ways. For example, all communications between the buyer, seller, marketeer, and vendors could be made between humans by telephone. However, in the preferred embodiment, the inventive method is software-implemented in an electronic commerce application and all communications are transmitted electronically between computers communicating via a communications network.

In the preferred embodiment, the marketeer provides an electronic marketplace, e.g., a website, wherein sellers of goods can register their goods with the marketeer for sale. The website is accessible to buyers and sellers via a communications network, such as the Internet. Buyers and sellers can communicate with the marketeer, or its marketeer controller, e.g., a web server, using an interface and interface software. For example, the buyer and seller interface may each comprise a personal computer running standard web browser software and having network access capability, as is known in the art.

FIG. 2 is a block diagram of a marketeer controller 70 in accordance with the present invention. The marketeer controller also includes a central processing unit ("CPU") 72, random access memory ("RAM") 74, read only memory ("ROM") 76, and a communications port ("COMM PORT") 78 connected to a network interface device 80 for communicating over a communications network. The marketeer controller 70 also includes a storage memory including a storage device 82 for storing data including a first program for receiving identification code data from a seller to identify a good presented for sale by a seller, a second program for receiving data representing a buyer's interest in purchasing a good, a shopping agent program for identifying an index price, a pricing agent program for deriving a sale price and other data required to complete sale transactions, e.g. buyer's and sellers identity or contact information, information representing seller's selection of a method for deriving a price, etc.

The marketeer controller is interconnected with or interconnectable to buyer and seller interfaces (i.e., computers running standard web browser software) via a communications network such that information can be transmitted back and forth between the buyer and seller interfaces and the marketeer controller and such that the marketeer controller can transmit information back and forth between third party vendors' computers (not shown).

Figure 3:
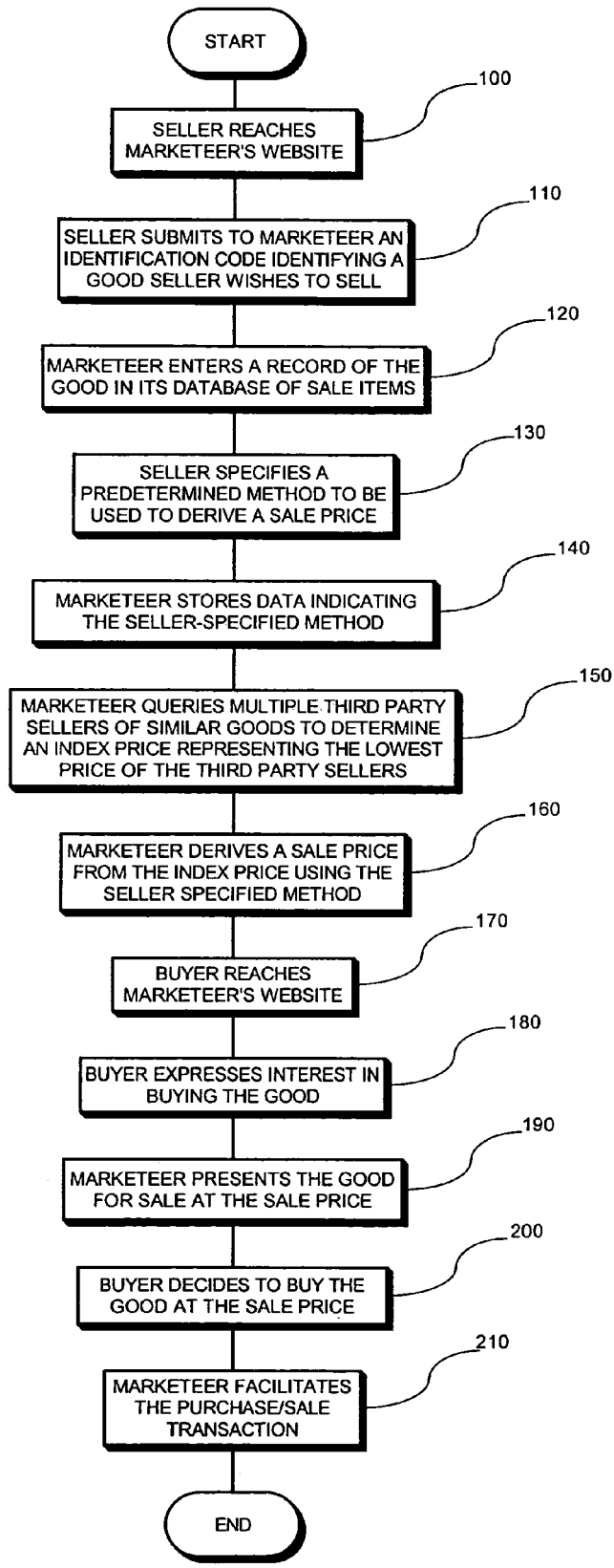
FIG. 3 is a flow diagram providing an example of a computer-implemented method for pricing and facilitating sale of an independent seller's good in accordance with the present invention.

FIG. 3 is a block diagram showing flow of an example of a computer-implemented method for pricing and facilitating sale of an independent seller's good in which the index price is determined near a time of registering the good for sale. A seller first reaches the marketeer's website, as shown at step 100. In effect, the seller is entering the marketeer's virtual marketplace. A seller may do so by visiting the marketeer's website using his buyer interface, i.e., personal computer, to access the marketeer controller via the communications network. The seller then identifies to the marketeer a good he wishes to sell, in effect, registering the good for sale with the marketeer. To do so, the seller submits a standard identification code to the marketeer, as shown at step 110. This may be achieved by the seller using his keyboard to enter the code into a field provided by the marketeer's website, as is known in the art. The standard identification code may be a universal product code (UPC) or an International Standard Book Number (ISBN), for example. The use of a standard identification code identifies the good in a manner readily identifiable by the marketeer and/or buyers. The marketeer controller stores the identification code in its memory to register the good as an item for sale by the seller, as shown at step 120. The marketeer controller may also store in its memory data provided by the seller to identify the seller as the owner of the good.

In accordance with the method, the seller does not specify a price but rather specifies a method for determining a sale price from an index price, as shown at step 130. As discussed above, the method could include a discount from a manufacturer's list price. In the preferred embodiment, the seller specifies a method including a discount from a price of a comparable new good by a certain percentage. This may be achieved, for example, by the seller's selection of an option from a menu presented by the marketeer, e.g., by selecting a button or check-box using his mouse, as is well known in the art. For example, the marketeer may present a menu of options for a 70% discount from a manufacturer's suggested retail price, a 70% discount from a price for a comparable new good, a 50% discount from a manufacturer's suggested retail price, or a 50% discount from a price for a comparable new good. The marketeer controller also stores in its memory data indicating the method specified by the seller for pricing the good, as shown at step 140. In one embodiment, the seller is also presented with an option for specifying a fixed price for the good.

The marketeer determines an index price for the good, as shown at step 150. In the preferred embodiment, determination of the index price is performed by the marketeer controller. To do so, the marketeer controller queries multiple third party vendors of comparable goods to determine their respective prices and to equate the index price to the lowest price of a group of third party vendors for a new good similar to the used good offered for sale by the seller. The querying step is performed by a shopping agent program stored in the memory of the marketeer controller. It is advantageous to use a standard product identification code, such as the UPC, to perform the query.

The marketeer then derives a sale price of the good from the index price using the method specified by the seller, as shown at step 160. This is performed by a pricing agent program stored in the memory of the marketeer controller. Preferably, the method includes a discount of the index price by approximately fifty percent to determine the sale price of the seller's good. In one embodiment, the seller is presented with the sale price and asked to confirm his desire to offer the good for sale at the sale price. After the marketeer controller has derived the sale price, it stores in its memory the sale price of the good.

At this point, the good is registered with the marketeer for sale by the seller. The marketeer has not taken possession of the good. After a period of time, a buyer enters the marketeer's marketplace by reaching the marketeer's website, as shown at step 170, using his personal computer to communicate with the marketeer controller via the communications network. The buyer may browse the marketeer's website to shop for a good. Presentation of electronic storefronts, including browsing and searching abilities is well known in the art. For example, books, music, and videos may be categorized by content or genre. Alternatively, for example, a buyer interested in a particular book may search by subject, author or title, and view an image of the cover of the book, read a description or review of the book, etc. In another embodiment, a buyer could search for an item using its standard unique ID code. Any method of categorizing, cataloging or searching may be used that enables a buyer or potential buyer to find a good for which he is looking or in which he may be interested.

If the buyer is interested in the possibility of purchasing a good, the buyer expresses interest in buying the good, as shown at step 180. The buyer may do so using any suitable method, as are well known in the art. For example, a buyer may use his mouse to select a button or click a checkbox displayed on a web page and appearing on his video monitor.

The marketeer then presents the good to the buyer for sale at the sale price, as shown at step 190. This may be achieved by transmitting to the buyer data for displaying the sale price and a description of the good on the video monitor of the buyer's personal computer.

If the buyer decides to buy the good at the sale price, as shown at step 200, he may indicate his intent to do so in a manner similar to that described above with reference to expression of his interest in purchasing the good. The marketeer then facilitates the sale transaction between the buyer and the seller, as shown at step 210. This may be achieved in a variety of ways. For example, the marketeer may refer the parties to an intermediary clearinghouse or escrow agent or may itself act as the intermediary. In the preferred embodiment, the buyer transmits identification information to the marketeer controller which the marketeer controller stores in its memory and the marketeer controller then identifies the seller to the buyer and the buyer to the seller so that they may complete the sale transaction.

This arrangement works particularly well for readily identifiable, fungible, durable goods which have been pre-owned or used since the goods are readily identified by both the buyer and the seller, all goods offer similar value to the consumer, and the fact that the good has been used does not significantly deplete the value of the good to the consumer.

In this manner, fair prices are ensured to buyers and sellers by allowing a price to be set as a function of an independent, third party vendor's price. Advantageously, the marketeer is not required to maintain an expensive inventory of goods, buyers do not have to shop tirelessly to get good values, and sellers don't have to monitor prices of similar goods. Additionally, in one embodiment, the buyer is ensured a lowest price for a good since the sale price is set using the seller-determined method at a discount from the lowest price of a seller or group of sellers of a comparable new good at the time of the sale, particularly when the index price is for a new good and the sale price is for a used good.

In one embodiment, goods in addition to those listed or registered for sale by sellers at the marketeer's website are presented by the marketeer for browsing by a buyer. Information concerning such additional goods may be retrieved from a database accessible to the marketeer controller. In one embodiment, the marketeer refers the buyer to a third party vendor if the buyer wishes to purchase the good and the good sought by the buyer is not listed for sale with the marketeer, e.g., by presenting a link to the vendor's website. In another embodiment, the seller is presented with opportunities to select a different pricing option and to thereby change the sale price or to remove the good from the marketeer's list of registered goods after registering the good for sale.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention.

Accordingly, the foregoing description is by way of example only, and not limiting. The invention is limited only as defined in the following claims and equivalents thereto.

What is claimed is:

1. A method for pricing goods offered for sale by independent sellers, the method being computer-implemented by a marketeer controller computer capable of communicating via a communications network, the marketeer controller computer including a microprocessor and a memory operatively connected to the microprocessor, the method comprising:

the marketeer controller computer receiving data from an independent seller, the data having been transmitted in electronic form to the marketeer controller computer via the communications network, the data identifying the independent seller's good as a specific commercially-available product;

the marketeer controller computer transmitting menu data to a computerized device orperated by the independent seller, the menu data being transmitted in electronic form via the communications network and causing the computerized device orperated by the independent seller to display via a display device a menu including a plurality of different options from which the independent seller may select an option, each of the plurality of different options corresponding to a respective method to be used by the marketeer controller computer for deriving a sale price at which a buyer may purchase the independent seller's good, each of the respective methods being predetermined and stored in memory accessible by the marketeer controller computer;

the marketeer controller computer receiving selection data from the independent seller, the selection data having been transmitted in electronic form to the marketeer controller computer via the communications network, the selection data identifying a certain selected option selected from the menu by the independent seller;

the marketeer controller computer deriving the sale price by performing a function in accordance with logic specified by a certain respective corresponding to the certain selected option selected from the menu by the independent seller; and the marketeer controller computer transmitting sale price data to the computerized device operated by the independent seller, the sale price data being transmitted in electronic form via the communications network and causing the computerized device operated by the independent seller to display to the buyer, via the display device, the derived sale price to present the good to the buyer as an item offered for sale at the sale price.

2. The method of claim 1, wherein the sale price is not determined at a time proximate to the marketeer controller computer's receipt of data from the independent seller that identifies the independent seller's good, but instead is determined at a subsequent time, proximate a time of sale of the good to the buyer.

3. The method of claim 2, wherein at least one of the predetermined respective methods to be used by the marketeer controller computer comprises logic specifying that the marketeer controller identify and discount a manufacturer's suggested retail price for the independent seller's good.

4. The method of claim 3, wherein the marketeer controller computer stores a database of manufacturer's suggested retail prices.

5. The method of claim 2, wherein at least one of the predetermined respective methods to be used by the marketeer controller computer comprises logic specifying that the marketeer controller identify and discount a price for a certain good in new condition when the independent seller's good is the certain good in used condition.

6. The method of claim 2, wherein the sale price is displayed to the buyer via a website.

7. The method of claim 6, further comprising:
the marketeer controller computer conducting a sale transaction to sell the good to the buyer at the determined sale price.

8. The method of claim 1, wherein the independent seller agrees, before sale of the good, to sell the good at an unspecified sale price to be subsequently determined by the marketeer controller computer proximate a time of sale of the good to the buyer, provided that the sale price will be determined in accordance with the certain respective method corresponding to the certain selected option selected from the menu by the independent seller.

9. The method of claim 8, wherein at least one of the predetermined respective methods to be used by the marketeer controller computer comprises logic specifying that the marketeer controller identify and discount a manufacturer's suggested retail price for the independent seller's good.

10. The method of claim 9, wherein the marketeer controller computer stores a database of manufacturer's suggested retail prices.

11. The method of claim 8, at least one of the predetermined respective methods to be used by the marketeer controller computer comprises logic specifying that the marketeer controller identify and discount a price for a certain good in new condition when the independent seller's good is the certain good in used condition.

12. The method of claim 1, wherein the sale price is not determined at a time proximate to the marketeer controller computer's receipt of data from the independent seller that identifies the independent seller's good, but instead is determined at a subsequent time, proximate to a time the buyer wishes to buy the good.

13. The method of claim 12, wherein at least one of the predetermined respective methods to be used by the marketeer controller computer comprises logic specifying that the marketeer controller identify and discount a manufacturer's suggested retail price for the independent seller's good.

14. The method of claim 12, wherein at least one of the predetermined respective methods to be used by the marketeer controller computer comprises logic specifying that the marketeer controller identify and discount a price for a certain good in new condition when the independent seller's good is the certain good in used condition.

15. The method of claim 1, wherein at least one of the predetermined respective methods to be used by the marketeer controller computer comprises logic specifying that the marketeer controller identify and discount a manufacturer's suggested retail price for the independent seller's good.

16. The method of claim 1, at least one of the predetermined respective methods to be used by the marketeer controller computer comprises logic specifying that the marketeer controller identify and discount a price for a certain good in new condition when the independent seller's good is the certain good in used condition.

17. The method of claim 1, wherein the sale price is displayed to the buyer via a website.

18. A method for pricing goods offered for sale by independent sellers, the method being computer-implemented by a marketeer controller computer capable of communicating via a communications network, the marketeer controller controller computer including a microprocessor and a memory operatively connected to the microprocessor, the method comprising:

the marketeer controller computer receiving data from an independent seller, the data having been transmitted in electronic form to the marketeer controller computer via the communications network, the data identifying the independent seller's good;

the marketeer controller computer transmitting menu data to a computerized device operated by the independent seller, the menu data being transmitted in electronic form via the communications network and causing the computerized device operated by the independent seller to display via a display device a menu including a plurality of selectable options from which the independent seller may select an option, each of the plurality of selectable options corresponding to a respective method to be used by the marketeer controller computer for determining a sale price at which a buyer may purchase the independent seller's good, each of the respective methods being predetermined and stored in memory accessible by the marketeer controller computer;

the marketeer controller computer receiving selection data from the independent seller, the selection data having been transmitted in electronic form to the marketeer controller computer via the communications network, the selection data identifying a certain selected option selected from the menu by the independent seller;

the marketeer controller computer setting a sale price at which a buyer may purchase the independent seller's good, the sale price being set by performing a function in accordance with logic specified by a certain respective method corresponding to the certain one of said plurality of selectable options selected from the menu by said independent seller; and the marketeer controller computer transmitting sale price data to the computerized device operated by the independent seller, the sale price data being transmitted in electronic form via the communications network and causing the computerized device operated by the independent seller to display to the buyer, via the display device, the sale price, to present the good to the buyer as an item available for purchase by the buyer at the sale price.

19. The method of claim 18, wherein at least one of the predetermined respective methods to be used by the marketeer controller computer comprises logic specifying that the marketeer controller identify another price and set the sale price as a function of the other price.

20. A method for pricing goods offered for sale by independent sellers, the method being computer-implemented by a marketeer controller computer capable of communicating via a communications network, the marketeer controller computer including a microprocessor and a memory operatively connected to the microprocessor, the method comprising:

the marketeer controller computer receiving data from an independent seller, the data having been transmitted in electronic form to the marketeer controller computer via the communications network, the data identifying the independent seller's good;

the marketeer controller computer transmitting menu data to a computerized device operated by the independent seller, the menu data being transmitted in electronic form via the communications network and causing the computerized device operated by the independent seller to display via a display device a menu including a plurality of selectable options from which the independent seller may select an option, each of the plurality of selectable options corresponding to a respective method to be used by the marketeer controller computer for determining a sale price at which a buyer may purchase the independent seller's good, each of the respective methods being predetermined and stored in a memory accessible by the marketeer controller computer;

the marketeer controller computer receiving selection data from the independent seller, the selection data having been transmitted in electronic form to the marketeer controller computer via the communications network, the selection data identifying a certain selected option selected from the menu by the independent seller;

proximate to a time of sale of the independent seller's good to a buyer, the marketeer controller computer calculating the sale price at which a buyer may purchase the independent seller's good, the sale price being calculated in accordance with logic specified by a certain respective method corresponding to the certain one of said plurality of selectable options previously selected from the menu by said independent seller, the predetermined method comprising a mathematical function; and the marketeer controller computer transmitting sale price data to the computerized device operated by the independent seller, the sale price data being transmitted in electronic form via the communications network and causing the computerized device operated by the independent seller to display to the buyer, via the display device, the calculated sale price to the buyer to present the good for sale to the buyer.

* * * * *